(12) United States Patent
Elstermann (10) Patent No.: US 6,771,657 B1
(45) Date of Patent: Aug. 3, 2004

(54) NON REAL-TIME DELIVERY OF MPEG-2 PROGRAMS VIA AN MPEG-2 TRANSPORT STREAM

(75) Inventor: Erik John Elstermann, Carlsbad, CA (US)

(73) Assignee: General Instrument Corporation, Horsham, PA (US)

( * ) Notice: Subject to any disclaimer, the term of this patent is extended or adjusted under 35 U.S.C. 154(b) by 798 days.

(21) Appl. No.: 09/685,447

(22) Filed: Oct. 11, 2000

Related U.S. Application Data (60) Provisional application No. 60/169,872, filed on Dec. 9, 1999.

(51) Int. Cl.[7] .................................................. H04J 3/16
(52) U.S. Cl. ........................ 370/465; 370/474; 370/477; 370/521; 370/537; 725/34; 725/89; 725/101
(58) Field of Search .................................. 370/464, 465, 370/474, 476, 477, 479, 498, 521, 529, 537; 725/32, 34, 35, 36, 87, 88, 89, 90, 91, 92, 101, 102, 151; 348/384, 423

(56) References Cited

U.S. PATENT DOCUMENTS

| | | | |
|---|---|---|---|
| 5,155,591 A | | 10/1992 | Wachob |
| 5,216,503 A | | 6/1993 | Paik et al. |
| 5,231,494 A | | 7/1993 | Wachob |
| 5,619,337 A | | 4/1997 | Naimpally |
| 5,650,825 A | * | 7/1997 | Naimpally et al. ......... 348/465 |
| 5,758,257 A | | 5/1998 | Herz et al. |
| 6,111,896 A | * | 8/2000 | Slattery et al. ............. 370/535 |
| 6,148,082 A | * | 11/2000 | Slattery et al. ............. 380/212 |
| 6,181,706 B1 | * | 1/2001 | Anderson et al. ........... 370/412 |
| 6,195,368 B1 | * | 2/2001 | Gratacap ..................... 370/535 |
| 6,233,253 B1 | * | 5/2001 | Settle et al. ................. 370/474 |
| 6,351,471 B1 | * | 2/2002 | Robinett et al. ............ 370/468 |
| 6,351,474 B1 | * | 2/2002 | Robinett et al. ............ 370/486 |
| 6,529,550 B2 | * | 3/2003 | Tahara et al. ............... 375/240 |
| 6,611,624 B1 | * | 8/2003 | Zhang et al. ............... 382/232 |

FOREIGN PATENT DOCUMENTS

| | | |
|---|---|---|
| EP | 0 805 598 | 11/1997 |
| EP | 0 944 268 | 9/1999 |
| WO | WO 98/02827 | 1/1998 |
| WO | WO 99/37048 | 7/1999 |

OTHER PUBLICATIONS

*Patent Abstracts of Japan*, Abstract of Japanese Patent "Low–Speed Data Multiplex Device and Data Transmission Device", Publication No. 10173622, Jun. 26, 1998, Japanese Application No. 08335267, Filed Dec. 16, 1996.

*Patent Abstracts of Japan*, Abstract of Japanese Patent "Multimedia Storage Device", Publication No. 2000041066, Feb. 8, 2000, Japanese Application No. 11132139, Filed May 13, 1999.

*Patent Abstracts of Japan*, Abstract of Japanese Patent "Data Transmission Method and Data Transmitting and Receiving Device", Publication No. 11177516, Jul. 2, 1999, Japanese Application No. 09364038, Filed Dec. 16, 1997.

* cited by examiner

Primary Examiner—Hassan Kizou
Assistant Examiner—D L
(74) Attorney, Agent, or Firm—Barry R. Lipsitz; Douglas M. McAllister

(57) ABSTRACT

Digital content is extracted from single and multiple-program transport streams for subsequent non-real-time (background) transmission in a bandwidth-efficient manner. At an encoder, several null and/or nonessential (N/N) packets (e.g., packets of unused programs) in a transport stream are replaced by an annotation packet (AP) to obtain non-real-time packets. The non-real time packets are inserted into null packet locations (NU) of a real time transport stream. At a decoder, the annotation packets are used to regenerate a specified number of null packets to maintain the original separation of packets of the non-real time data (for timing purposes), allowing existing hardware and/or software to decode the selected program.

51 Claims, 4 Drawing Sheets

NON REAL-TIME DELIVERY OF MPEG-2 PROGRAMS VIA AN MPEG-2 TRANSPORT STREAM

This application claims the benefit of U.S. Provisional Application No. 60/169,872, filed Dec. 9, 1999.

BACKGROUND OF THE INVENTION

The present invention relates to digital television, and more particularly to a method and apparatus by which MPEG-2 programs or the like may be extracted from a transport stream and delivered via the same or another transport stream at a fraction of the program's original transport rate, or stored using less capacity than required to store the original transport stream. In this manner, the invention enables a receiving device to receive, store, and decode the program at some future, user-initiated time.

In bandwidth-limited systems, a tradeoff exists between the number of digital TV programs that may be delivered concurrently and their subjective quality. A need may also exist to allow the delivery of programs in non-real-time as enhanced services which do not impact the quality of programs delivered in real-time. Such enhanced services could include commercial advertisements that are applicable to the receiving device and "played out" by remote control (e.g., during a commercial break). Moreover, it would be advantageous to provide a capability to deliver programs requested by the user of the receiving device on a non-real-time basis, i.e., after the original real-time transmission of a program.

In the past, the issue of picture quality versus the number of programs to be carried over a given bandwidth has been addressed by employing statistical multiplexing (see, e.g., U.S. Pat. No. 5,216,503 to Paik et al.). Services such as video-on-demand have also been provided where the bandwidth necessary to convey such information is accommodated by additional physical channels.

Various schemes for selecting between different real-time television signals are also known in the prior art. For example, U.S. Pat. Nos. 5,155,591 and 5,231,494 describe targeted advertising that is delivered in real-time. Such advertising may be selected by a decoder employing customer "profiles", as disclosed in U.S. Pat. No. 5,758,257. However, such schemes are predicated on the transmission of concurrent real-time (analog and digital) TV programs.

U.S. Pat. No. 5,619,337 describes a system for recording MPEG-2 transport streams. The goal is to address the recording of a single program stream extracted from a multi-program transport stream onto a device such as a digital VCR for subsequent playback.

It would be advantageous to provide a bandwidth-efficient system for conveying digital television programs and/or other content (e.g., multimedia) in their original format, which may comprise, for example, MPEG-2 transport packets. The system should allow the programs and other content to be provided on a non-real-time basis for later use by a recipient. Such content should be able to be easily received, recorded on a digital VCR or otherwise stored, and played back at the user's convenience. It would be still further advantageous to permit the communication of multiple digital TV programs and/or other content with little or no impact on the quality of real-time programs delivered via the same transport stream.

The system should enable the delivery of pre-encrypted content to one or more decoders in non-real-time, wherein authorization data is provided to the decoders at a common time to enable decryption and playback.

The present invention provides a method and apparatus enjoying the aforementioned and other advantages.

SUMMARY OF THE INVENTION

The present invention makes use of allocated bandwidth and/or bandwidth made available by variable bit rate (VBR) program streams to provide a bandwidth-efficient scheme for conveying content such as digital television programs and/or multimedia information in their original form (e.g., MPEG-2 transport packets). A large portion of currently available MPEG-2 decoder hardware and/or software may be used to decode content delivered per the invention. The invention also, in effect, allows the delivery of multiple non-real-time digital TV programs and other content with little to no impact to the quality of content delivered in real-time via the same transport stream.

A particular method in accordance with the invention provides data of at least a first program of a first data stream in an input transport stream, where the transport stream includes data of at least a second data stream. The method includes the steps of: extracting null packets and/or nonessential packets of the first data stream, providing an annotation packet that provides information regarding the extracted packets, and inserting the annotation packet and program packets of the first program into the input transport stream in place of null packets of the second data stream to form an output transport stream.

A decoding method is provided for processing an output transport stream that includes data of at least a first program and a second data stream. The method includes the steps of: recovering program packets of the first program, storing the recovered packets at a storage device, recovering an annotation packet from the output transport stream, and regenerating a number of null packets of the first program based on the recovered annotation packet to provide regenerated data that is suitable for decoding. The output transport stream is formed at an encoder by extracting null packets and/or nonessential packets of a first data stream that carries the first program, and inserting the annotation packet and the program packets of the first program into an input transport stream in place of null packets of the second data stream. The annotation packet provides information regarding the extracted packets.

Corresponding apparatuses are also presented.

DETAILED DESCRIPTION OF THE INVENTION

The present invention may be implemented using two key elements, namely a Data Stream Generator/encoder and a Data Stream Player/decoder. The Data Stream Generator, which is responsible for extracting real-time programs, storing them and re-inserting them as non-real-time data, can exist as a standalone product for use, e.g., with any MPEG-2 encoder or multiplexer, including the DigiCipher® II encoder products available from a division of Motorola Corporation that was formerly known as General Instrument Corporation, Horsham, Pa., U.S.A. MPEG-2 is described in ISO/IEC IS 13818-1, International Standard, MPEG-2 Systems. The invention can also be used with data that is provided according to, e.g., Draft ATSC Data Broadcast Specification, ATSC T3/S13 Doc. 010, Rev. 0.20, Feb. 9, 1999, DVB Specification for Data Broadcasting, ETSI EN 3-1 192 V1.1.1 (1997-12), or other digital packetized data formats.

Furthermore, the invention can be implemented in hardware, firmware, software, or any combination thereof. Additional processing such as transcoding (to reduce the bit rate of the original programs) can also be applied to reduce the delivery time of program data to the receiving device, reduce the required storage capacity, and/or to allow for multiple programs to be delivered concurrently.

The Data Stream Player may comprise, e.g., an MPEG-2 decoder or decoder enhancement which receives the transport stream, extracts and stores the data stream (based on criteria established by its user or the transport stream provider), and decodes the data stream when initiated by the user or transport stream provider.

Moreover, the Data Stream Generator and Player can employ access control whereby the non-real-time data may only be decoded when the proper authorization is provided to the Player, even if the non-real-time stream has already been delivered and stored. Content can then be securely provided (e.g., by using entitlement control messages—ECMs) in advance of its "official" release, allowing the content to be immediately played in its entirety upon official release. In this manner, for example, new releases of digital movies and other premium entertainment can be delivered in advance for later viewing. The present invention can also deliver content such as targeted advertisements, news and the like in non-real-time to a decoder for subsequent playback based, for example, on a customer profile.

The present invention, and in particular the use of "annotation" packets as described hereinafter, can also be used to facilitate the recording of digital content on a digital VCR or the like, as it reduces content storage requirements and allows additional information to be conveyed about the content. Such information can be used, for example, to facilitate playback control (e.g., targeted ad profile data, location of I-frames for fast forward/rewind functions, etc.), and for transmission error handling.

Figure 1:
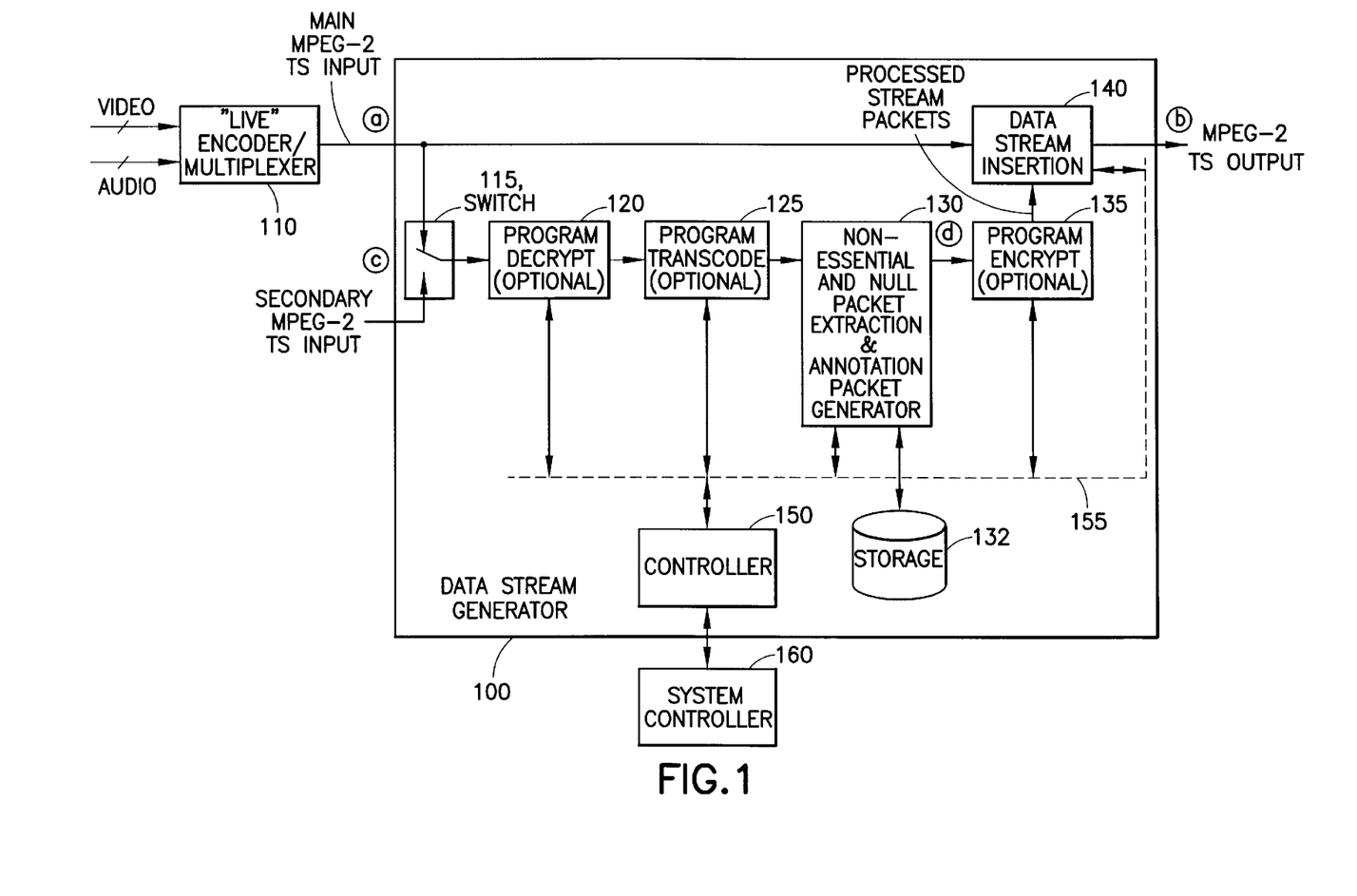
FIG. 1 is a block diagram of a Data Stream Generator in accordance with the invention.

FIG. 1 illustrates a Data Stream Generator (DSG) 100 in accordance with the invention. A main transport stream (TS) input, provided from audio/video data at a "live" encoder/multiplexer 110, and, optionally, at least one secondary TS input, are provided to the DSG 100. A switch 115 provides either the main or secondary TS input to an optional program decryption function 120 and an optional program transcode function 125. The transcode function 125 is used when it is desired to reduce the bit rate of the input program. Decryption is used when an encrypted input is received and it is desired to transcode it.

A nonessential and null packet extraction and annotation packet generator 130 removes nonessential and/or null packets from the input program and forms corresponding annotation packets in accordance with the invention. Null packets are inserted at an encoder to maintain a desired bit rate, whereas the nonessential packets may include other program packets that are not used. For example, a TS may be distributed nationally by satellite to a number of different headends of a cable television network. Each network may have its own program line up that does not use all of the received programs. The unused program are therefore non-essential to that associated network.

The annotation packets provide information regarding the null and/or nonessential packets by providing information that describes them, such as the number of null and nonessential packets. Preferably, one annotation packet provides information for several null nonessential packets. Successive annotation packets are used for successive respective groups of null and/or nonessential packets. An associated storage device 132 may store the processed stream with the annotation packets.

The program packets (e.g., comprising audio and video data) and annotation packets are output from the function 130 to an optional program encrypt function 135. These packets together form a processed or condensed data stream, which is a condensed version of the packets that were output from the switch 115. At a data stream insertion function 140, the packets of the processed stream are inserted into the main TS, e.g., using multiplexing. Specifically, the processed stream packets replace null packets of the main TS input. Thus, there is no loss of important data in the main TS.

Note that the processed stream may be inserted back into the TS from which it was derived. For example, when the switch passes the input from path "all", the processed stream is derived from the main TS input, and is inserted back into the main TS input. Or, the processed stream may be derived from the secondary TS input (path "c") and inserted into the main TS input.

The components of the DSG 100 are under the control of a central controller 150, e.g., via a bus 155. The controller 150, in turn, may be responsive to a system controller 160, e.g., that receives an operator input. For example, an operator may set parameters for transcoding, decryption and encryption, or to specify nonessential programs, e.g., according to a PID.

The DSG 100 extracts content (e.g., MPEG-2 video) from any of its MPEG-2 transport stream inputs, which can be "live" (e.g., received from a broadcast) or "off-line" (e.g., retreived from storage), processes the data (as described below), and replaces null packets present in the "live" transport stream with the processed, non-real-time-data. This processed data may be delivered over an indefinite period, e.g., using carouseling, which involves periodic, repeated transmission of data.

Figure 2:
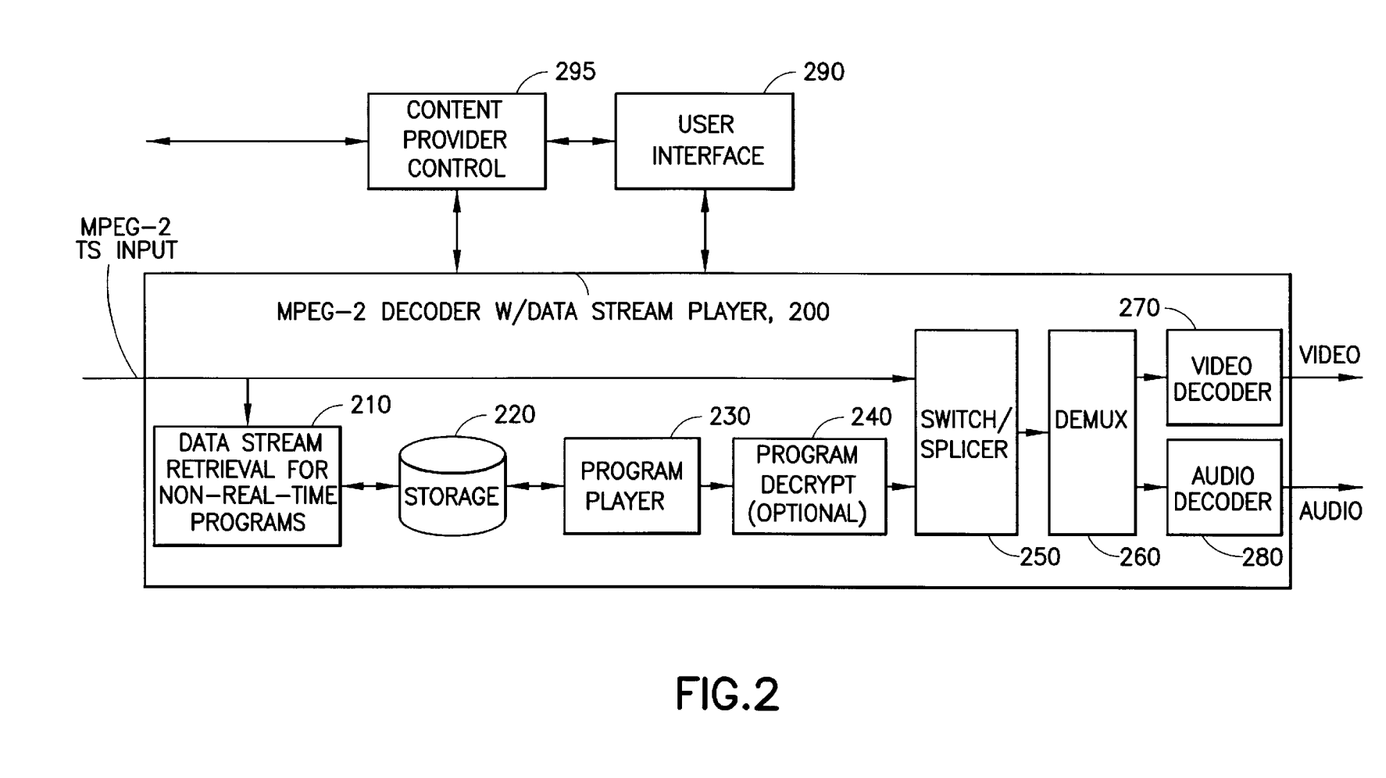
FIG. 2 is a block diagram of a Data Stream Player in accordance with the invention.

FIG. 2 illustrates a Data Stream Player (DSP) 200, also according to the invention. The DSP 200 may be embodied as a set-top box decoder or the like at a user's location. The DSP 200 receives a transport stream (TS) input, such as the TS at path "b" in FIG. 1, at a data stream retrieval function 210 and at a switch/splicer 250. The TS includes real-time program packets of one or more programs (e.g., channels or services), along with the non-real-time insertion stream packets, including the annotation packets thereof. The data stream retrieval function 210 extracts the non-real-time program data and associated annotation packets for storage.

The program player 230 performs the function of regenerating null packets to limit the amount of storage 220 required. In particular, the player 230 analyzes the annotation packets to regenerate a number of null packets based on the number of null and/or nonessential packets that are described by the associated annotation packets. Error handling procedures may also be applied, as discussed elsewhere. The regenerated stream is forwarded to a storage device 220 for subsequent retrieval. Successive portions of the stream may be stored while additional portions continue to be received and processed at the function 210. A program player 230 initiates playback of the stored data at the storage device 220, e.g., in response to a user request, by forwarding the data to the switch/splicer 250, with optional decryption, if required, at a program decryption function 240.

In a switch mode, the switch/splicer 250 provides either the original TS input or the retrieved program data to a demux 260 for subsequent processing at a video decoder 270 and an audio decoder 280. The demux routes the video and audio packets to the appropriate decoder and, may also demux specific program packets of the TS, e.g., according to a PID and a desired channel that is tuned by the user.

In a splice mode, the switch/splicer 250 splices packets of the retrieved insertion stream with the TS input. Splicing may be performed by using splice messages ("cues") present in the real-time or non-real-time program streams. Switching implies a "hard-switch" that may result in a brief, noticeable disruption (e.g., picture roll, audio pop, etc.).

A user interface 290 is provided for allowing the user to tune or playback desired programs.

Thus, in addition to supporting the decode and display of "live" (e.g., real-time) programs, the Data Stream Player 200 retrieves selected non-real-time programs and stores them for future playback. The storage and playback may be initiated locally or remotely, depending on the application. For example, in the case of movies, the user of the Data Stream Player 200 may specifically select which programs to store and view, e.g., via the interface 290. In the case of advertisements delivered as MPEG-2 programs, the content provider (e.g., transport stream supplier, network operator or the like) may want to specify which advertisements are stored and viewed, based on the attributes of the Data Stream Player (e.g., location of the player 200, user preferences, user demographics, etc.) A content provider control function 295 may be used to communicate with the content provider for this purpose.

As show in FIG. 2, the Data Stream Retrieval function 210 retrieves and stores the selected program data stream (including annotation packets) from the input transport stream. It may make use of the annotation packets to replace erroneous packets. At a time specified by the Data Stream Player user or the content provider, the Program Player 230 extracts a selected program data stream from storage, determines the original transport stream rate of the program, and clocks packets out at that rate. This is accomplished using information contained in the annotation packets to regenerate the null packets of the original transport stream, thereby allowing existing hardware and/or software to decode and display the selected program. The Program Decryption function 240 may also be employed to decrypt the program after it is generated by the Program Player 230, allowing the program to be stored in its encrypted form until the appropriate entitlements are provided by the content provider, e.g., using known access control techniques. This allows sensitive material to be securely delivered prior to the time of its intended use.

Note that the Data Stream Generator and Data Stream Player described herein may be combined to provide an efficient method for storage and playback of programs obtained from single and multi-program transport streams.

Figure 3:
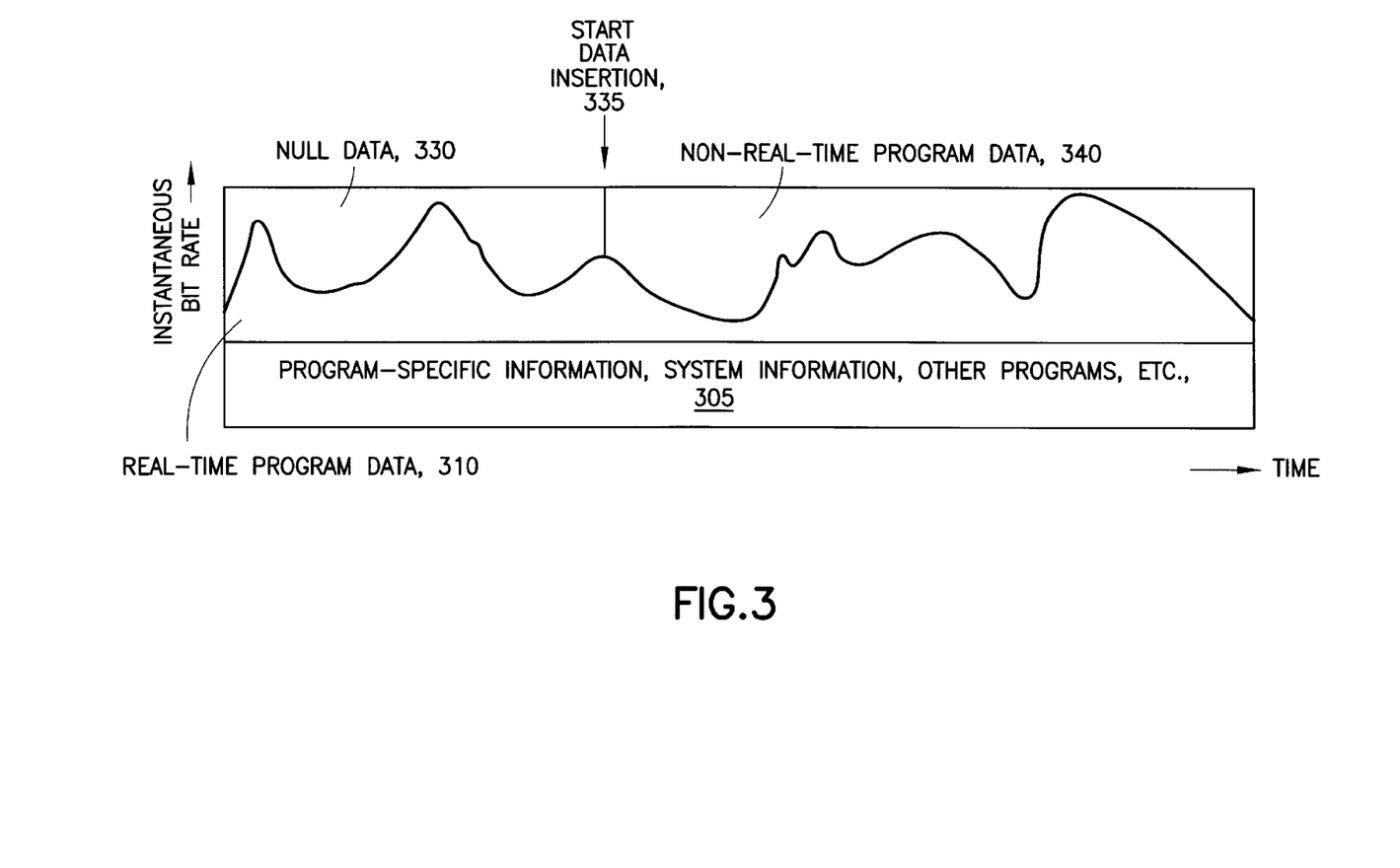
FIG. 3 depicts an example of an MPEG-2 transport stream prior to and after, processing by the Data Stream Generator in accordance with the invention.

FIG. 3 depicts an example of a transport stream prior to and after processing by the DSG 100. An instantaneous bit rate versus time is shown. A total instantaneous bit rate prior to a data insertion time 335 is the sum of bit rates for a component 305 that includes program-specific information, system information, other programs, etc., real-time program data 310 (e.g., including audio and video), and null and other nonessential data 330. After the data insertion time 335, the total instantaneous bit rate is the sum of bit rates for the data component 305, real-time program data 310, and the inserted non-real-time program data 340. Note that the real-time program data may transition between successive events (e.g., programs, commercials, news announcements, and the like).

In this example, the video stream for the real-time program(s) is depicted as a variable bit rate (VBR) stream, with peaks and valleys in the instantaneous bit rate that occur based on factors such as picture complexity, picture coding type and the like. However, the invention may also be used where the real-time program(s) have a fixed bit rate allocation.

Moreover, although only one non-real-time data stream is shown, the DSG may deliver multiple substantially concurrent non-real-time data streams in its output. Additionally, these data streams may have fixed and/or variable bit rates.

Also, note that the figure is not to scale, as there are typically a number of real-time channels in a TS, such that the region 305 consumes a larger proportion of the TS's bandwidth than indicated. However, the invention is suitable for use when there is only one real-time channel in a TS.

Figure 4:
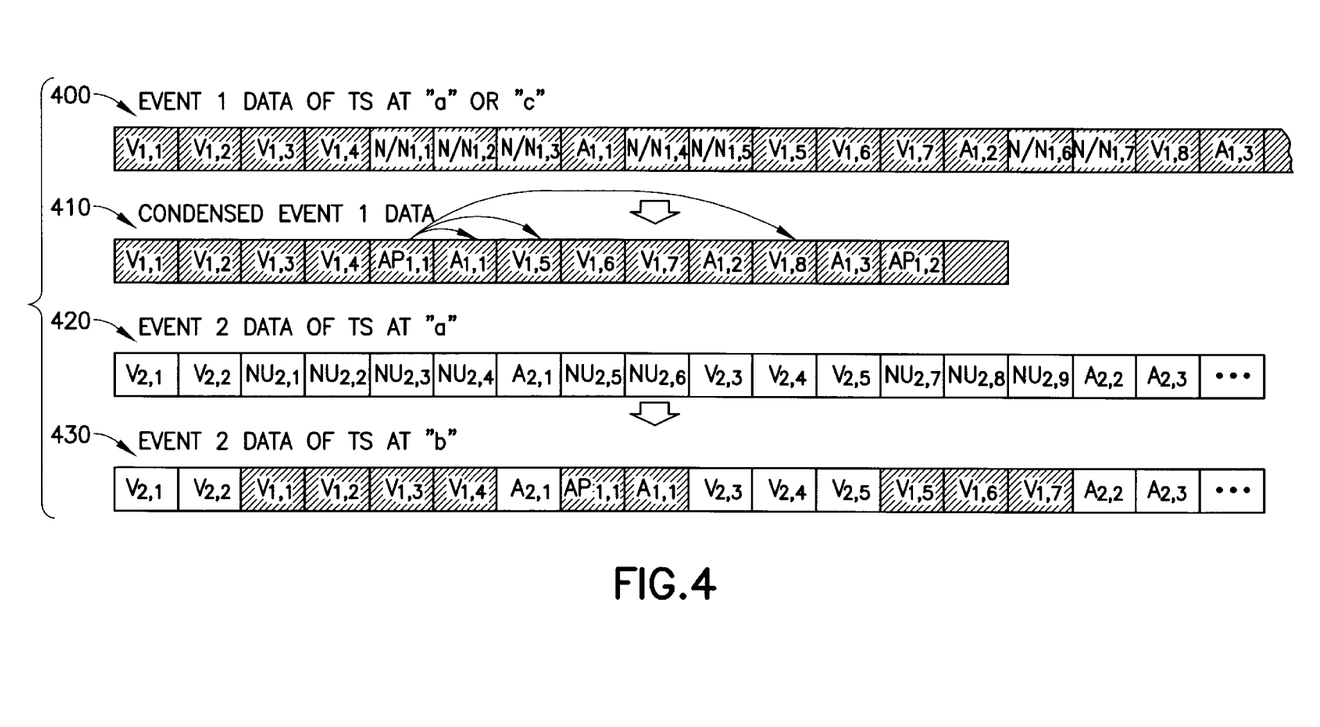
FIG. 4 illustrates the transport streams and data provided at various points in FIG. 1, including the use of annotation packets, in accordance with the invention.

FIG. 4 illustrates the transport streams and data provided at various points in FIG. 1 in accordance with the invention. As shown in FIG. 1, the DGS 100 replaces MPEG-2 null and other nonessential packets received via input "a" with processed program data received via input "a" and/or input "c". As mentioned, the Nonessential and Null Packet Extraction and Annotation Packet Generator function 130 replaces nonessential and null packets with annotation packets, and provides the resulting processed stream to the storage device 132 and/or the Data Stream Insertion function 140, which replaces null packets received at input "a" with this processed stream data.

As an example, FIG. 4 illustrates the transport streams and data provided at points "a", "b", "c", and "d" of FIG. 1. The data 400 represents the real-time TS at "a" or "c", e.g., for a first event (e.g., a program, commercial, etc.) The data 410 represents non-real-time insertion data for the first event which is formed from processing the data 400. The data 420 represents a real-time TS at "a", e.g., for a second event. The data 430 represents a real-time TS at "b" which is formed from inserting the packets of the data 410 in place of null packets of the data 420.

Each packet includes an identifier indicating whether it is a video packet "V", an audio packet "A", a null and/or nonessential packet "N/N", a null packet "NU", or an annotation packet "AP". Additionally, the subscripts indicate a transport stream, and a packet sequence for that type of packet in the TS. For example, $V_{1,2}$ designates a second video packet in a first TS.

Each packet may be an 188-byte MPEG packet, although other packet formats and sizes may be used.

The data 410 comprises the video and audio packets from the stream.400, and also provides an annotation packet $AP_{1,1}$ that describes, and substitutes for, the null and/or nonessential packets $N/N_{1,1}$ through $N/N_{1,7}$. $A_{1,3}$ is the last packet covered by $AP_{1,1}$. That is, in a specific example, the annotation packet provides information regarding any null and/or nonessential packets in a group of, e.g., eighteen packets in the data 400. The data 410 is essentially a condensed version of the data 400.

A subsequent annotation packet $AP_{1,2}$ describes a subsequent number of null and/or nonessential packets in a subsequent group of packets of the data 400, starting at $N/N_{1,8}$ . . . .

The null packets in the stream 420 are replaced by the video and audio packets, and the annotation packet $AP_{1,1}$ from the stream 410. In particular, as shown at 430, $V_{1,1}$ replaces $NU_{2,1}$, $V_{1,2}$ replaces $NU_{2,2}$, and so forth. The video and audio packets of the second TS, $V_{2,1}$ through $V_{2,5}$, and $A_{2,1}$ through $A_{2,3}$, respectively, are maintained in the stream 430 at the same position as in the stream 420.

In FIG. 4, the shaded packets represent the non-real time, insertion packets.

Each annotation packet (AP) provides information regarding the number of null and/or nonessential packets from the original transport stream that it replaces. It may also contain a timecode which describes the location of the next program access unit (e.g., the next audio or video packet) within the event, allowing the Data Stream Player to identify transport packets indicated to be erroneous (e.g., via the packets' transport_error_indicator bit) and replace them if and when the correct packets are received. As known from the MPEG-2 standard, transport_error_indicator is a one-bit flag. When set to '1', the flag indicates that at least one uncorrectable bit error exists in the associated TS packet.

The annotation packet may also contain information to facilitate user navigation (e.g., the location of the next I-frame for fast-forward/rewind operation, the location of the next scene in a movie, the start of the next song, etc.).

The Data Stream Generator may encrypt the non-real-time packets. In one aspect of the invention, packets generated by the Nonessential Packet Extraction and Annotation Packet Generator 130 are encrypted using a key for which authorization data, such as an entitlement management message (EMM), is not distributed to the Data Stream Player until some future time, allowing future concurrent activation of all Data Stream Players.

An example of the use of annotation packets in accordance with the invention is seen by referring to the streams 400 and 410. Annotation packets contain program-specific information and are conveyed via a unique packet identifier (PID). Each annotation packet describes the number and location of null and/or nonessential packets (i.e., packets not associated with the selected program stream) within the original transport stream. For example, $AP_{1,1}$ may include information indicating that three null and/or nonessential packets ($N/N_{1,1}$ through $N/N_{1,3}$) are provided prior to the first (next) program packet ($A_{1,1}$), that two additional null and/or nonessential packets ($N/N_{1,4}$ and $N/N_{1,5}$) are provided prior to the second next program packet ($V_{1,5}$), and that two further null and/or nonessential packets ($N/N_{1,6}$ and $N/N_{1,7}$) are provided prior to the sixth next program packet ($V_{1,8}$).

Annotation packets may also include information to describe the original transport packet rate and identify the location of packets within a program. For example, a time code or codes may be included in the annotation packet to facilitate navigation to user-specified times. Such a time code may also be useful in locating and replacing packets received erroneously (e.g., in applications where the Data Stream is repeated or "carouseled"). Annotation packets may contain all, or a portion, of an Annotation message formatted as a private section using the example syntax shown in Table 1 below. In the tables below, the Mnemonic "uimsbf" stands for "unsigned integer, most significant bit first" and the mnemonic "bslbf" stands for "bit string, left bit first."

TABLE 1

Annotation Section

| Syntax | No. of bits | Mnemonic |
| --- | --- | --- |
| annotation_section() { | | |
|    table_id | 8 | uimsbf |
|    section_syntax_indicator | 1 | bslbf |
|    private_indicator | 1 | bslbf |
|    reserved | 2 | bslbf |
|    section_length | 12 | uimsbf |
|    for ( i=0;I<section_length-4;i++) { | | |
|       descriptors( ) | 8 | bslbf |
|    } | | |
|    checksum | 32 | uimsbf |
| } | | | section_syntax_indicator is set to '0', indicating that private data bytes exist immediately following the section_length field.
checksum is set as defined by ISO/IEC 13818-6. It is calculated over the entire section.

The following descriptors are defined for use in the annotation section:

TABLE 2

Null Packet Identifier Descriptor

| Syntax | No. of bits | Mnemonic |
| --- | --- | --- |
| null_packet_identifier_descriptor() { | | |
|    descriptor_tag | 8 | uimsbf |
|    descriptor_length | 8 | uimsbf |
|    number_of_null_packets_string | N*8 | uimsbf |
| } | | | number_of_null_packets_string is a string of bytes that describe the number of null or nonessential packets (in the original transport stream) that precede each of the service packets following the annotation packet that contains this descriptor and prior to the next annotation packet. Values are represented as follows:

0x00–0xFE: 0–254
   0xFF00–0xFFFE 255–509
   0xFFFF00–0xFFFFFE 510–764 etc.

A value of zero indicates that no null or nonessential packets exist. A value of 0xFF is used as an escape code to extend the length of this field to describe null packet sequences in excess of 254 bytes. Each subsequent value of 0xFF describes an additional 255 bytes of null or nonessential packets. For example, a number_of_null_packets_string value of 0x1000FFFF0300FE0A indicates the following:

The $1^{st}$ service packet following the annotation section is preceded by sixteen null and/or nonessential packets in the original transport stream.

The $2^{nd}$ service packet is preceded by zero null and/or nonessential packets (i.e., it is contiguous with the $1^{st}$ service packet)

The $3^{rd}$ service packet is preceded by 513 (255+255+3) null and/or nonessential packets.

The $4^{th}$ service packet is preceded by zero null and/or nonessential packets (i.e., it is contiguous with the $3^{rd}$ service packet).

The $5^{th}$ service packet is preceded by 254 null and/or nonessential packets.

The 6$^{th}$ service packet is preceded by 10 null and/or nonessential packets.

The null_packet_identifier_descriptor may describe up to descriptor_length subsequent service packets. In typical applications (where the occurrence of 255 contiguous null or non-service packets is rare); an annotation packet can describe up to 174 service packets. This represents a transmission and/or storage overhead of 0.57%. This can be seen by noting that the maximum size of a null_packets_string, if contained entirely within one 188-byte annotation packet, is 174 bytes. So, in the best case, one annotation packet may be used to describe the number of N/N packets that precede each of up to 174 packets. The best case means the number of contiguous N/N packets between each service packet is less than 255; this is typically the case. So, one AP can describe up to 174 service packets, and 1/174=0.00575 or 0.57% is the overhead.

TABLE 3

Transport Packet Rate Descriptor

| Syntax | No. of bits | Mnemonic |
| --- | --- | --- |
| transport_packet_rate_descriptor() { | | |
| descriptor_tag | 8 | uimsbf |
| descriptor_length | 8 | uimsbf |
| transport_packet_rate | 32 | uimsbf |
| } | | | transport_packet_rate is the original transport packet rate in bits per second and is optional. It may be used by the Data Stream Player to control its output transport stream rate.

It should now be appreciated that the present invention provides a system for extracting programs from single and multiple-program transport streams for subsequent non-real-time ("background") transmission in a bandwidth-efficient manner. Such "programs" may include anything from targeted commercial advertisements to broadcast full-length movies. A non-real-time program is formed from a real-time transport stream by providing annotation packets that describe the original packet separation (timing) of the program. The non-real-time packets are inserted into a real-time transport stream by replacing null packets therein. At a decoder, the annotation packets are used to maintain the proper spacing between the program packets.

A system is also provided for delivering pre-encrypted programs in non-real-time. In this case, entitlement control messages (ECMs) may be included; however, entitlement management messages (EMMs) necessary to decrypt a program or programs may not be distributed until some future time specified by the program provider. This allows mass distribution for storage prior to a formal program "release." After "release" of the content, the decoder, if authorized, is permitted to decrypt the program(s).

Although the invention has been described in connection with a preferred embodiment, numerous adaptations and modifications may be made thereto without departing from the scope of the invention as set forth in the claims.

What is claimed is:

1. A method for providing data of at least a first program of a first data stream in an input transport stream, said transport stream comprising data of at least a second data stream, comprising the steps of:

extracting at least one of null packets and nonessential packets of the first data stream;

providing at least one annotation packet that provides information regarding the extracted packets; and inserting the at least one annotation packet and program packets of the first program into the input transport stream in place of null packets of the second data stream to form an output transport stream.

2. The method of claim 1, wherein:

the second data stream is provided in real-time in the input and output transport streams.

3. The method of claim 1, wherein:

the program packets of the first program are provided in non-real-time in the output transport stream.

4. The method of claim 1, wherein:

the program packets of the first program are obtained from the input transport stream.

5. The method of claim 1, wherein:

the program packets of the first program are obtained from a transport stream that is different than the input transport stream.

6. The method of claim 1, wherein:

the program packets of the first program are obtained from a storage device.

7. The method of claim 1, comprising the further step of:

transcoding the program packets of the first program prior to said inserting step.

8. The method of claim 1, wherein:

packets of at least one additional program are inserted into the input transport stream in place of null packets of the second data stream to form the output transport stream.

9. The method of claim 1, wherein:

the at least one annotation packet is provided with its own packet identifier to enable identification thereof by a decoder.

10. The method of claim 1, wherein:

the information regarding the extracted packets indicates a number of the null and/or nonessential packets in the first data stream.

11. The method of claim 1, wherein:

the information regarding the extracted packets indicates a location of the null and/or nonessential packets in the first data stream.

12. The method of claim 1, wherein:

the at least one annotation packet comprises a time code that is usable in replacing a first packet copy that is received erroneously by a decoder by a second packets copy that is subsequently transmitted to the decoder.

13. The method of claim 1, wherein:

a plurality of annotation packets are provided and inserted into the input transport stream; and each annotation packet provides information regarding a respective group of extracted null and/or nonessential packets.

14. The method of claim 1, wherein:

the nonessential packets comprise program data from a program that is not desired to be recovered.

15. The method of claim 1, wherein:

the at least one annotation packet contains a time code that describes a location of at least one subsequent program packet in the first program.

16. The method of claim 15, wherein:

the time code is adapted to be used by a decoder that receives the output transport stream to identify and replace erroneous packets of the output transport stream.

17. The method of claim 1, wherein:

the at least one annotation packet comprises facilitating information to facilitate playback of the first program at a decoder.

18. The method of claim 17, wherein:
the facilitating information comprises time code data.

19. The method of claim 17, wherein:
the facilitating information designates a location of a next I-frame in the first program for fast-forward/rewind operations.

20. The method of claim 17, wherein:
the facilitating information designates a location of a next scene in the first program.

21. The method of claim 17, wherein:
the facilitating information designates a location of a next audio passage in the first program.

22. The method of claim 1, comprising the further step of:
communicating the output transport stream to at least one decoder;
at the decoder, recovering at least some of the program packets of the first program, and storing the recovered packets at a storage device; and
retrieving the stored packets for playback on an output device in accordance with a control signal.

23. The method of claim 22, comprising the further step of:
at the decoder, recovering data from the at least one annotation packet that indicates a bit rate for playing back the stored packets.

24. The method of claim 22, wherein:
the control signal is provided in accordance with a user who is local to the decoder.

25. The method of claim 22, wherein:
the control signal is provided by a provider associated with the output transport stream who is remote from the decoder.

26. The method of claim 22, wherein the program packets of the first program comprise encrypted data, comprising the further step of:
providing authorization data to the decoder to enable the decoder to decrypt the encrypted data at a specified time after the program packets of the first program have been recovered and stored at the storage device.

27. The method of claim 22, comprising the further steps of:
at the decoder, recovering the at least one annotation packet from the output transport stream; and
regenerating a number of null packets in accordance with the at least one recovered annotation packet to provide regenerated data that is suitable for decoding.

28. An apparatus for providing data of at least a first program of a first data stream in an input transport stream, said transport stream comprising data of at least a second data stream, comprising:
means for extracting at least one of null packets and nonessential packets of the first data stream;
means for providing at least one annotation packet that provides information regarding the extracted packets; and
means for inserting the annotation packet and program packets of the first program into the input transport stream in place of null packets of the second data stream to form an output transport stream.

29. A method for processing an output transport stream received at a decoder, wherein the output transport stream comprises data of at least a first program and a second data stream, comprising the steps of:
recovering program packets of the first program;
storing the recovered packets at a storage device;
recovering at least one annotation packet from the output transport stream; and
regenerating a number of null packets of the first program in accordance with the recovered annotation packet to provide regenerated data that is suitable for decoding;
wherein:
the output transport stream is formed at an encoder by extracting at least one of null packets and nonessential packets of a first data stream that carries the first program, wherein the at least one annotation packet provides information regarding the extracted packets, and inserting the at least one annotation packet and the program packets of the first program into an input transport stream in place of null packets of the second data stream.

30. The method of claim 29, comprising the further step of:
recovering data from the at least one annotation packet that indicates a bit rate for playing back the stored packets.

31. The method of claim 29, wherein:
the program packets of the first program comprise encrypted data; and
authorization data is provided to the decoder to enable the decoder to decrypt the encrypted data at a specified time after the program packets of the first program have been recovered and stored at the storage device.

32. The method of claim 29, wherein:
program packets of the second data stream are provided in real-time in the input and output transport streams.

33. The method of claim 29, wherein:
the program packets of the first program are provided in non-real-time in the output transport stream.

34. The method of claim 29, wherein:
packets of at least one additional program are inserted into the input transport stream in place of null packets of the second data stream to form the output transport stream.

35. The method of claim 29, wherein:
the at least one annotation packet has its own packet identifier for enabling its recovery from the output transport stream.

36. The method of claim 29, wherein:
the information regarding the extracted packets indicates a number of the null packets and/or nonessential packets in the first data stream.

37. The method of claim 29, wherein:
the information regarding the extracted packets indicates a location of the null packets and/or nonessential packets in the first data stream.

38. The method of claim 29, wherein:
the at least one annotation packet comprises a time code that is usable in replacing a first packet copy that is received erroneously by a second packet copy that is subsequently received.

39. The method of claim 29, wherein:
a plurality of annotation packets are provided and inserted into the input transport stream; and
each annotation packet provides information regarding a respective group of extracted null packets and/or nonessential packets.

40. The method of claim 29, wherein:
the nonessential packets comprise program data from a program that is not desired to be recovered.

41. The method of claim 29, wherein:

the at least one annotation packet contains a time code that describes a location of at least one subsequent program packet in the first program.

42. The method of claim 41, wherein:

the time code is used to identify and replace erroneous packets of the output transport stream.

43. The method of claim 29, comprising the further step of:

retrieving the stored packets for playback on an output device in accordance with a control signal.

44. The method of claim 43, wherein:

the control signal is provided in accordance with a user who is local to the decoder.

45. The method of claim 43, wherein:

the control signal is provided by a provider associated with the output transport stream who is remote from the decoder.

46. The method of claim 29, wherein:

the at least one annotation packet comprises facilitating information to facilitate playback of the first program.

47. The method of claim 46, wherein:

the facilitating information designates a location of a next audio passage in the first program.

48. The method of claim 46, wherein:

the facilitating information comprises time code data.

49. The method of claim 46, wherein:

the facilitating information designates a location of a next I-frame in the first program for fast-forward/rewind operations.

50. The method of claim 46, wherein:

the facilitating information designates a location of a next scene in the first program.

51. A decoder for processing an output transport stream received thereat, wherein the output transport stream comprises data of at least a first program and a second data stream, comprising:

means for recovering program packets of the first program;

a storage device for storing the recovered packets;

means for recovering at least one annotation packet from the output transport stream; and means for regenerating at least one of null packets and nonessential packets of the first program in accordance with the recovered at least one: annotation packet to provide regenerated data that is suitable for decoding; wherein:

the output transport stream is formed at an encoder by extracting the null packets and/or nonessential packets of a first data stream that carries the first program, wherein the at least one annotation packet provides information regarding the extracted packets, and inserting the at least one annotation packet and the program packets of the first program into an input transport stream in place of null packets of the second data stream.

\* \* \* \* \*

UNITED STATES PATENT AND TRADEMARK OFFICE
CERTIFICATE OF CORRECTION

PATENT NO.   : 6,771,657 B1
DATED        : August 3, 2004
INVENTOR(S)  : Elstermann It is certified that error appears in the above-identified patent and that said Letters Patent is hereby corrected as shown below:

Column 10,
Line 43, delete the "s" at the end of the word "packets".

Column 14,
Line 18, delete the ":" after the word "one".

Signed and Sealed this

Twelfth Day of October, 2004

JON W. DUDAS
*Director of the United States Patent and Trademark Office*